UNITED STATES PATENT OFFICE.

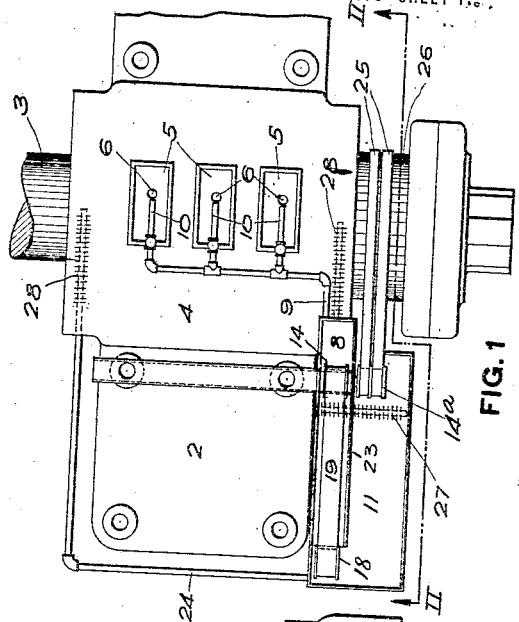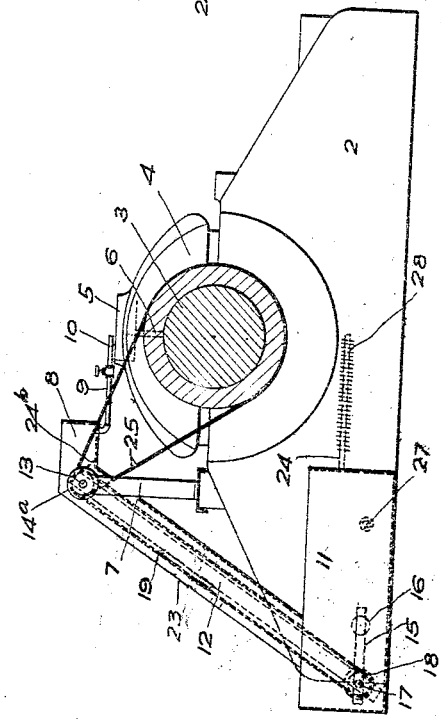

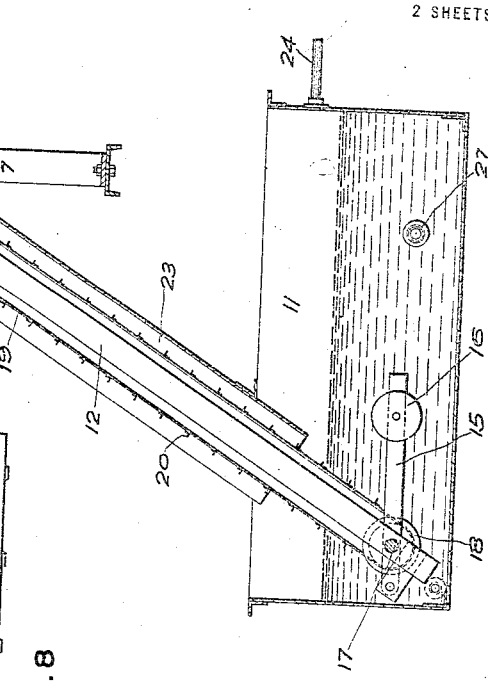
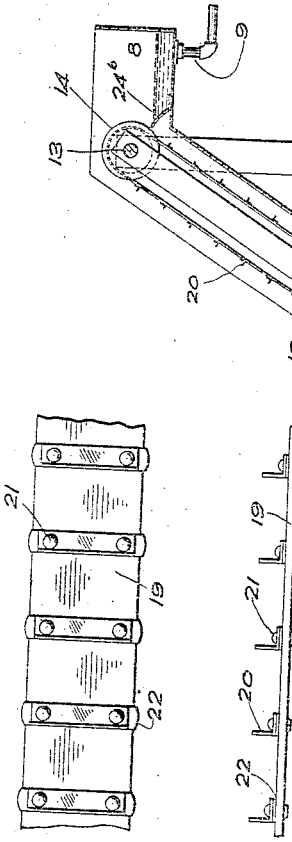
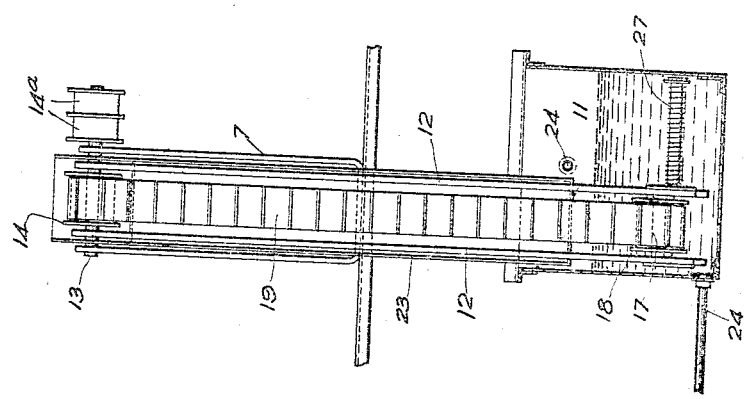

BERTHOLD G. BECK, OF GARY, INDIANA, ASSIGNOR TO AMERICAN SHEET AND TIN PLATE COMPANY, OF PITTSBURGH, PENNSYLVANIA, A CORPORATION OF NEW JERSEY.

LUBRICATING DEVICE.

1,161,590.   Specification of Letters Patent.   Patented Nov. 23, 1915.

Application filed August 25, 1915. Serial No. 47,256.

*To all whom it may concern:*

Be it known that I, BERTHOLD G. BECK, a citizen of the United States, residing at Gary, in the county of Lake and State of Indiana, have invented certain new and useful Improvements in Lubricating Devices, of which the following is a specification.

My invention relates to apparatus used in supplying lubricating oil to the outboard bearings or pillow blocks for the shafts of rolling mill engines and similar large shaft bearings.

One object of my invention is to provide a novel lubricating apparatus having improved means for supplying and maintaining a constant supply of oil or other lubricant to shaft bearings and similar rotating (or rocking) members.

Another object of the invention is to provide lubricating mechanism having improved means whereby existing bearings not provided with oil rings, or bearings whose large size prevents the use of oil rings, are provided with a continuously flowing and constant supply of oil or other liquid lubricant.

Another object of this invention is to provide a self-contained lubricating apparatus which is operative at all times when the shaft or other member to be lubricated is being rotated or rocked.

Another object of my invention is to provide lubricating apparatus having means whereby the long lubricant supply and return pipes or lines required by existing systems are eliminated, wherein freezing of the lubricant is avoided and prevented, and in which the lubricant is heated to maintain the desired degree of fluidity when found necessary.

A further object of the invention is the provision of apparatus for lubricating, having the novel combination and arrangement of parts shown in the drawings, to be more fully described hereinafter and specifically pointed out in the appended claims.

Referring now to the drawings forming part of this specification, Figure 1 is a plan showing a shaft bearing or pillow-block having lubricating apparatus constructed and arranged and applied for use therewith in accordance with my invention. Fig. 2 is a side elevation of the apparatus of Fig. 1, the section being taken on the irregular line II—II of Fig. 1. Fig. 3 is an end elevation showing a modified form of lubricating apparatus constructed and arranged and applied for use on the bearing of a jack shaft or other large rotating member. Fig. 4 is a side elevation of the apparatus shown in Fig. 3. Fig. 5 is a sectional side elevation on a larger scale of the lubricating apparatus shown in Figs. 1 and 2. Fig. 6 is an end elevation, partly in section, of the lubricating apparatus shown in Fig. 5. Fig. 7 is a plan and Fig. 8 is a side elevation showing a detail in the construction of the endless belt forming part of my improved lubricating apparatus.

In the accompanying drawings, referring now to Figs. 1 and 2, and Figs. 5 and 6, the numeral 2 designates the outboard bearing or pillow-block of a rolling mill engine shaft 3, and 4 is the removable cap for the bearing 2.

The cap 4 is provided with a series of oil pockets or recesses 5 which are provided with transverse holes 6 forming openings extending from the pockets 5 to the inside of the bearing cap 4 to supply oil or other lubricant to the contacting surfaces of the shaft incased by the bearing and bearing cap.

Mounted on a U-shaped bracket 7, which is secured to and located at one side of the bearing 2 so as to be above the top of the bearing cap 4 is an oil tank or receptacle 8 which is provided with an outlet pipe 9, and the outlet pipe 9 has a series of three valve controlled branches 10, one of which leads into each of the recesses or oil cellars 5 in the bearing cap 4.

Positioned on the floor at one side of the bearing 2 and beneath the upper receptacle 8 is another tank or receptacle 11 in which a quantity of oil or other lubricant is constantly maintained. The tanks 8 and 11 which are rectangular in outline as shown may be of any required shape or size.

Pivotally secured to the upper ends of the U-shaped bracket or support 7, within the receptacle 8, is one end of an inclined frame 12 (see Figs. 5 and 6), which extends angularly downward with its lower end extending into the receptacle 11. The pivot shaft 13 by which the frame 12 is secured to the bracket 7 is provided at an intermediate point in its length with a belt wheel 14, and secured on one end of the shaft 13 is a double pulley 14ª.

Pivoted by one end to the lower end of the frame 12 are lever arms 15, these lever arms having counterweights 16 on one end thereof, and rotatably secured by a shaft 17 to the lever arms 15, at an intermediate point in the length of the lever arms 15, is a belt pulley 18. Extending between the belt pulleys 14 and 18 is an endless belt 19, the counterweights 16 on the arms 15 serving as an automatic tightener or stretcher for maintaining the required tension on the endless belt 19.

The belt driving pulleys 14ª are made of such size relative to the diameter of the coupling hub 26 as to give the belt 19 a surface speed which will throw off the oil by centrifugal force into the receptacle 8 from the portion of the belt 19 passing around the pulley 14.

One surface of the belt 19 (the outer surface as shown) is provided at intervals with angle members 20 which are fastened by rivets 21 or in any other desired manner to the belt, the angle members extending lengthwise across the width of the belt to form means for lifting oil or other lubricant from the tank or receptacle 11 to the tank or receptacle 8.

Metal strips 22 which extend lengthwise across the width of the belt 19 are provided at intervals in its length to prevent chafing of the belt by the flanges of the pulleys around which the belt is stretched.

A casing 23 which is connected at one end to the open side of the elevated tank or receptacle 8 extends angularly downward with its open lower end within the open top of the receptacle 11. The partition 24ᵇ in one end of the receptacle 8 serves to maintain a pool of oil in this receptacle at all times.

The bearing 2 is provided with a recess beneath the shaft 3, into which the lubricant drains from the shaft 3, and connecting this recess or oil pocket with the receptacle 11 are pipes 24, 24, forming return lines through which the lubricant flows from the pocket in the bearing 2 into the receptacle 11.

Belts 25 extend around the cylindrical hub of the coupling 26 (which is fixed to the end of the shaft 3) and the pulleys 14ª on the end of the shaft 13 to drive the belt 19 whenever the shaft 3 is rotated.

A coil 27 forming an electric heater is provided within the tank or receptacle 11 to enable the lubricant within this tank to be maintained at a temperature above the freezing point and insure the oil's being at all times fluid enough to flow easily, and a similar heating coil 28 is provided on the return lines 24 leading from the pocket in the bearing 2 into the receptacle 11.

In the modified apparatus shown in Figs. 3 and 4, the bearing 2ª does not have an oil pocket formed therein, so that a pocket 29 is removably secured on each side of the pillow block or shaft bearing 2ª into which the lubricant drains from the bearing 2ª and bearing cap 4ª. The pipe 24ª forms a return line which connects the outlet or drain openings of the pockets 29 with the tank or receptacle 11ª.

In the construction of Figs. 3 and 4 a belt 19 forming an oil elevator similar to that shown in Figs. 5 and 6 is employed to carry the lubricant from the receptacle 11ª into the elevated receptacle 8ª which is located above and at one side of the bearing cap 4ª, this belt also being driven fast enough to throw off the lubricant into the receptacle 8ª by centrifugal force from the portion of the belt passing around the pulley 14ᵇ, and the pipe 9ª conducts the oil or other lubricant from the receptacle 8ª to the oil inlet opening in the boss 30 on the bearing cap 4ª.

The shaft 13ª for the belt pulley 14ᵇ is provided on one end with an endless rope 15ª to form a driving belt by which the shaft 13ª is operatively connected with the shaft 3ᵉ. The lower end of the oil conveyer is counterweighted as shown in Figs. 5 and 6, and the belt 19 extending between the pulleys 14ᵇ and 18ª is provided with angle members 20 in the same manner as has been described.

In the operation of my improved apparatus shown in Figs. 1 and 2, a supply of oil or other lubricant is placed in the receptacle 11. When the shaft 3 is rotated the endless belt 19 will lift and carry lubricant from the receptacle 11 into the receptacle 8 above the bearing 2. The lubricant supplied in this way to the receptacle 8 flows through the pipe 9 and branches 10 into the oil cellars 5 in the cap 4 of the bearing 2 so that a constant supply of oil is provided.

Should the amount of lubricant lifted into the receptacle 8 by the belt exceed that required for lubricating the bearing 2, the excess will flow over the partition 24ᵇ in the receptacle 8 and will be carried by the casing 23 into the receptacle 11.

The lubricant delivered through the pipe 10 into the recesses or pockets in the cap 4, after coming into contact with and lubricating the shaft, is deposited within the pocket in the bearing 2 and flows by gravity from this pocket through the return pipes 24 into the receptacle 11. The electric coils in the receptacle 11 and on the return pipes keep the lubricant heated sufficiently to prevent freezing or becoming thick, and will maintain the lubricant in condition to readily flow even in the most extreme cold weather.

The advantages of my invention will be apparent to those skilled in the art.

The apparatus is simple, is easily and cheaply kept in operative condition, and is applicable to existing bearings having oil pockets or not and on bearings of a size so large as to prevent the use of oil pockets.

By providing lubricating apparatus as shown and described, the necessity of long feed and return pipes and of using a storage tank and independently operated pumping mechanism, is avoided and overcome.

The apparatus is always operated when the shaft to which it is applied is rotated and automatically becomes inoperative when such shaft is at rest.

Modifications in the construction and arrangement of parts may be made within the scope of my invention as defined in the appended claims.

I claim:—

1. In a lubricating apparatus, the combination with a shaft bearing of a receptacle having an inlet connected to said bearing, said inlet being arranged to deliver lubricant to the receptacle by gravity, a second receptacle having an outlet, said outlet being arranged to deliver lubricant to the bearing by gravity, and means for conveying lubricant from the first to the second receptacle, said means including an endless belt, a casing connecting said receptacles and surrounding the belt, and means operatively connecting the belt with the shaft in said bearing.

2. In a lubricating apparatus, the combination with a shaft bearing of a receptacle having an inlet connected to said bearing, said inlet being arranged to deliver lubricant to the receptacle by gravity, a second receptacle above said first receptacle having an outlet, said outlet being arranged to deliver lubricant to the bearing by gravity, and means for conveying lubricant from the first to the second receptacle, said means including an endless belt, a casing connecting said receptacles and surrounding the belt, and means operatively connecting the belt with the shaft in said bearing.

3. In a lubricating apparatus, the combination with a shaft bearing of a receptacle having an inlet connected to said bearing, said inlet being arranged to deliver lubricant to the receptacle by gravity, a second receptacle having an outlet, said outlet being arranged to deliver lubricant to the bearing by gravity, and means for conveying lubricant from the first to the second receptacle, said means including a frame, belt pulleys on the ends of said frame, an endless belt around said pulleys, means for driving said belt and pulleys, and a counterweighted arm connected to one pulley for maintaining said belt under tension.

4. In a lubricating apparatus, the combination with a shaft bearing of a receptacle having an inlet connected to said bearing, said inlet being arranged to deliver lubricant to the receptacle by gravity, a second receptacle having an outlet, said outlet being arranged to deliver lubricant to the bearing by gravity, and means for conveying lubricant from the first to the second receptacle, said means including an endless belt having projections at intervals on its outer surface, a casing connecting said receptacles and surrounding the belt, and means operatively connecting the belt with the shaft in said bearing.

5. In a lubricating apparatus, the combination with a shaft bearing of a receptacle having an inlet connected to said bearing, said inlet being arranged to convey lubricant to the receptacle by gravity, means for electrically heating said lubricant conveying means, a second receptacle having an outlet, said outlet being arranged to deliver lubricant to the bearing by gravity, means for conveying lubricant from the first to the second receptacle, said means including an endless belt, a casing connecting said receptacles and surrounding the belt, and means operatively connecting the belt with the shaft in said bearing.

6. In a lubricating apparatus, the combination with a shaft bearing of a receptacle having an inlet connected to said bearing, said inlet being arranged to deliver lubricant to the receptacle by gravity, means for electrically heating said receptacle, a second receptacle having an outlet, said outlet being arranged to deliver lubricant to the bearing by gravity, means for conveying lubricant from the first to the second receptacle, said means including an endless belt, a casing connecting said receptacles and surrounding the belt, and means operatively connecting the belt with the shaft in said bearing.

In testimony whereof I have hereunto set my hand.

BERTHOLD G. BECK.